United States Patent
Huang et al.

(10) Patent No.: US 11,907,529 B2
(45) Date of Patent: Feb. 20, 2024

(54) MEMORY MANAGEMENT METHOD, MEMORY STORAGE DEVICE, AND MEMORY CONTROL CIRCUIT UNIT

(71) Applicant: PHISON ELECTRONICS CORP., Miaoli (TW)

(72) Inventors: Sheng-Min Huang, Hsinchu County (TW); Kuo-Hwa Ho, Miaoli (TW); Shih-Ying Song, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 121 days.

(21) Appl. No.: 17/671,597

(22) Filed: Feb. 15, 2022

(65) Prior Publication Data

US 2023/0221863 A1 Jul. 13, 2023

(30) Foreign Application Priority Data

Jan. 10, 2022 (TW) ................................. 111100899

(51) Int. Cl.
*G06F 13/16* (2006.01)
*G06F 3/06* (2006.01)

(52) U.S. Cl.
CPC .......... *G06F 3/0604* (2013.01); *G06F 3/0659* (2013.01); *G06F 3/0679* (2013.01)

(58) Field of Classification Search
CPC ...... G06F 3/0604; G06F 3/061; G06F 3/0611; G06F 3/0613; G06F 3/0614; G06F 3/0616; G06F 3/0617; G06F 3/0619; G06F 3/0659; G06F 3/0679; G06F 13/1642; G06F 13/18
USPC .............................. 711/154, 158; 710/5, 6, 7
See application file for complete search history.

(56) References Cited

U.S. PATENT DOCUMENTS

| 7,694,007 | B1 * | 4/2010 | Dubrovsky | G06F 9/505 709/233 |
| 11,797,187 | B2 * | 10/2023 | Canepa | G06F 3/0611 |
| 2019/0278515 | A1 * | 9/2019 | Wells | G06F 3/064 |
| 2021/0279001 | A1 * | 9/2021 | Kanno | G06F 3/0656 |
| 2022/0057966 | A1 * | 2/2022 | Kanno | G06F 3/0659 |

* cited by examiner

*Primary Examiner* — Ilwoo Park
(74) *Attorney, Agent, or Firm* — JCIPRNET (57) ABSTRACT

A memory management method, a memory storage device, and a memory control circuit unit are provided. The memory management method includes: obtaining a first weight value corresponding to a first command in a command queue, wherein the command queue is used to store at least one command to be executed; obtaining a second weight value corresponding to at least one second command being executed; and in response to a sum of the first weight value and the second weight value being greater than a base value, delaying an execution of the first command.

15 Claims, 6 Drawing Sheets

| Type of operation | Weight value |
|---|---|
| Read | V(1) |
| Write | V(2) |
| Erase | V(3) |

FIG. 8

| Type of operation | Weight value |
|---|---|
| 1-plane read | P(1) |
| 4-plane read | P(2) |
| 4-plane write | P(3) |
| Erase | P(4) |
| Read burst | P(5) |

MEMORY MANAGEMENT METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 111100899, filed on Jan. 10, 2022. The entirety of the above-mentioned patent application is hereby incorporated by reference herein and made a part of this specification.

BACKGROUND

Technical Field

The disclosure relates to a memory management technology, and more particularly to a memory management method, a memory storage device, and a memory control circuit unit.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small size, and no mechanical structure, the rewritable non-volatile memory module is very suitable for being built into the various portable electronic devices exemplified above.

Generally speaking, a controller (also referred to as a memory controller) of a memory storage device limits the number of memory modules (or memory channels) that are busy at a certain period (or a certain timepoint) to avoid issues such as overheating or power overload of the memory storage device. However, although such limitation can ensure the operational stability of the memory storage device, the limitation also often causes the working efficiency of the memory storage device to be reduced for no reason when system resources are still abundant.

SUMMARY

The disclosure provides a memory management method, a memory storage device, and a memory control circuit unit, which can take into account both the operational stability and the efficiency of the memory storage device.

An exemplary embodiment of the disclosure provides a memory management method for a rewritable non-volatile memory module. The memory management method includes the following steps. A first weight value corresponding to a first command in a command queue is obtained. The command queue is used to store at least one command to be executed. A second weight value corresponding to at least one second command being executed is obtained. In response to a sum of the first weight value and the second weight value being greater than a base value, an execution of the first command is delayed.

An exemplary embodiment of the disclosure further provides a memory storage device, which includes a connection interface unit, a rewritable non-volatile memory module, and a memory control circuit unit. The connection interface unit is used to couple to a host system. The memory control circuit unit is coupled to the connection interface unit and the rewritable non-volatile memory module. The memory control circuit unit is used to perform the following. A first weight value corresponding to a first command in a command queue is obtained. The command queue is used to store at least one command to be executed. A second weight value corresponding to at least one second command being executed is obtained. In response to a sum of the first weight value and the second weight value being greater than a base value, an execution of the first command is delayed.

An exemplary embodiment of the disclosure further provides a memory control circuit unit, which is used to control a rewritable non-volatile memory module. The memory control circuit unit includes a host interface, a memory interface, a buffer memory, and a memory management circuit. The host interface is used to couple to a host system. The memory interface is used to couple to the rewritable non-volatile memory module. The memory management circuit is coupled to the host interface, the memory interface, and the buffer memory. The memory management circuit is used to perform the following. A first weight value corresponding to a first command in a command queue is obtained. The command queue is used to store at least one command to be executed. A second weight value corresponding to at least one second command being executed is obtained. In response to a sum of the first weight value and the second weight value being greater than a base value, an execution of the first command is delayed.

Based on the above, after obtaining the first weight value corresponding to the first command in the command queue and the second weight value corresponding to the at least one second command being executed, in response to the sum of the first weight value and the second weight value being greater than the base value, the execution of the first command can be delayed. As such, both the operational stability and the efficiency of the memory storage device can be taken into account.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
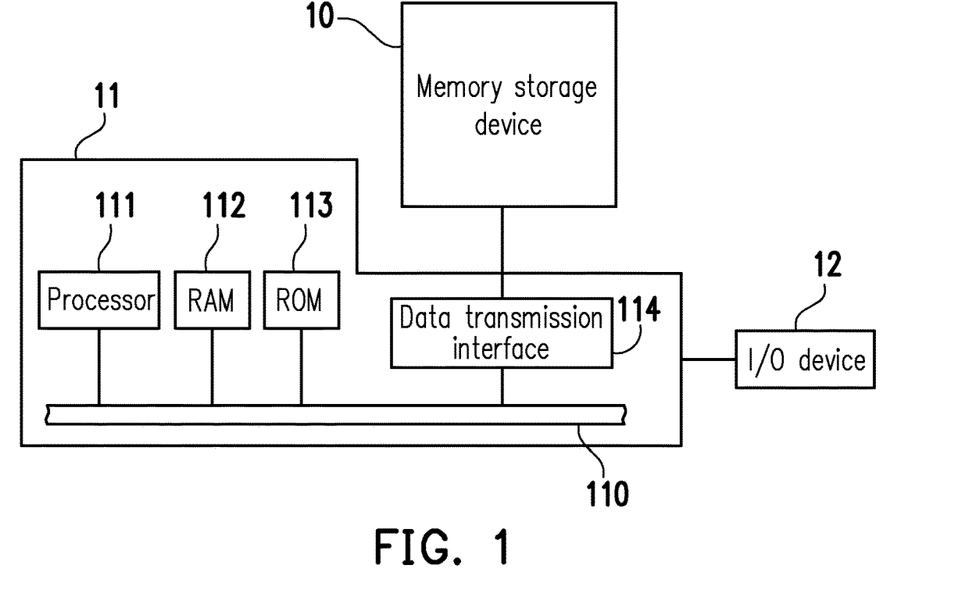
FIG. 1 is a schematic diagram of a host system, a memory storage device, and an input/output (I/O) device according to an exemplary embodiment of the disclosure.
Figure 2:
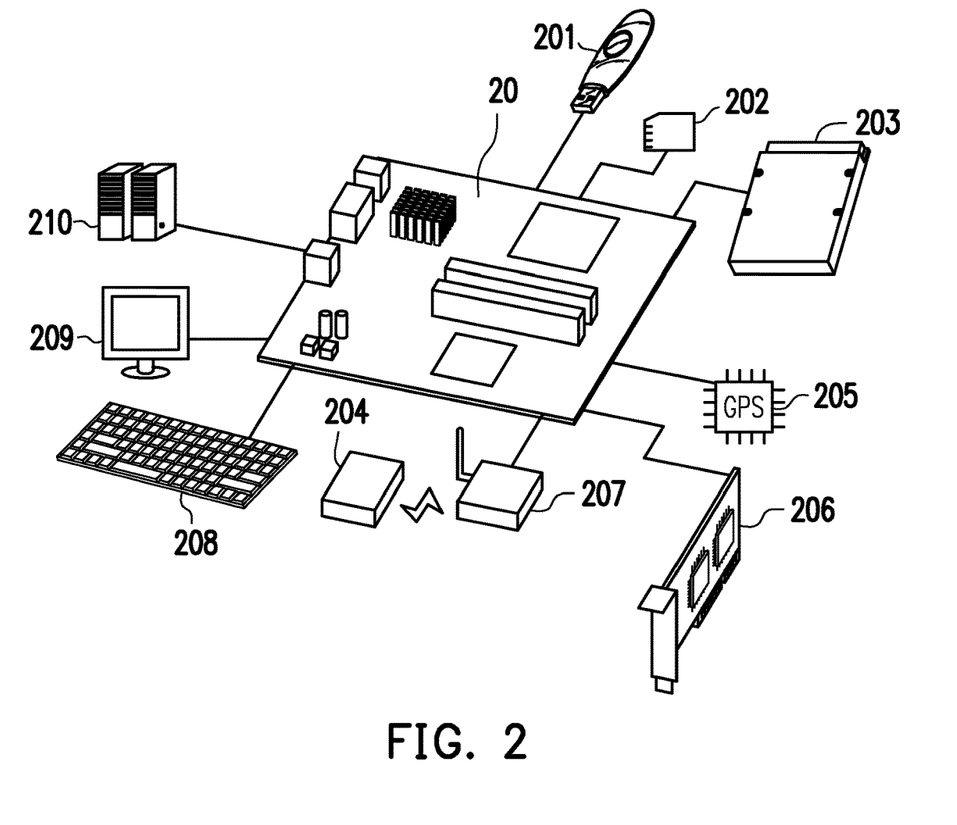
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
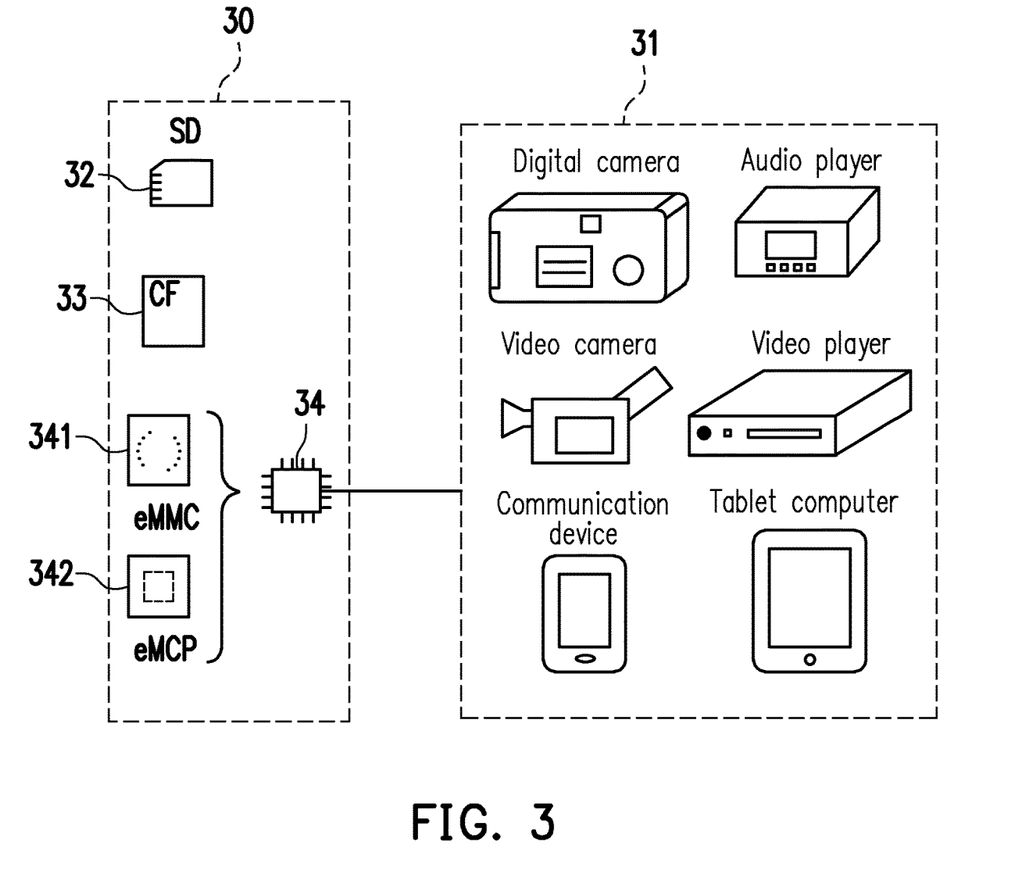
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
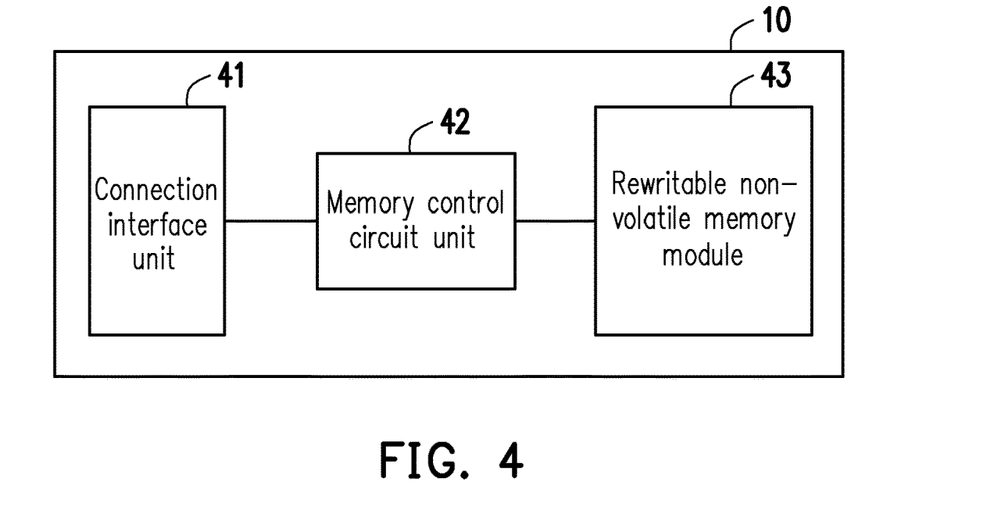
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the multi chip package (MCP) interface standard, the multi media card (MMC) interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage states. Through applying a read voltage, it is possible to judge which storage state a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
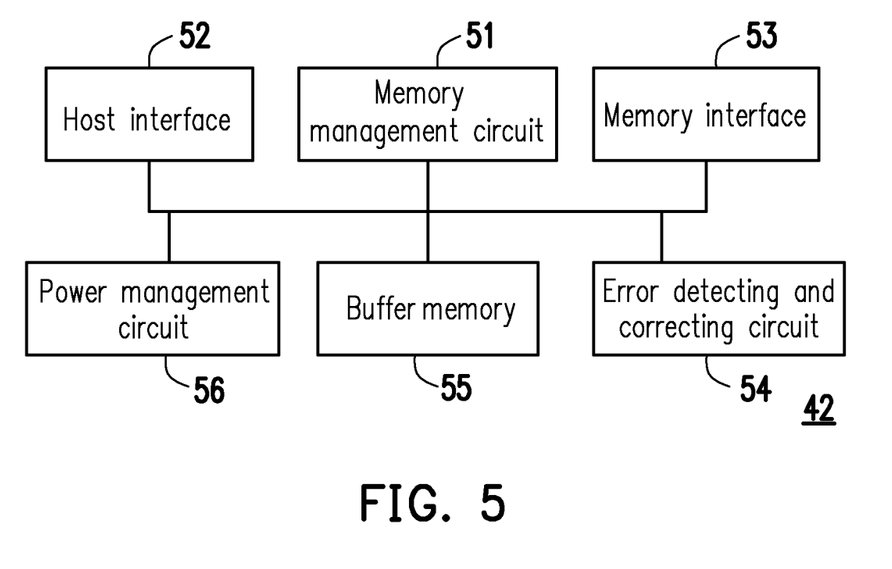
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage collection operation, etc.). The command sequences are, for example, generated by the memory management circuit 51 and sent to the rewritable non-volatile memory module 43 through the memory interface 53. The command sequences may include one or more signals or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data will also be read, and the error detecting and correcting circuit 54 will execute error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the memory management circuit 51 may include a detection circuit. The detection circuit may be used to analyze the type of at least one command obtained from the host system 11. In an exemplary embodiment, the detection circuit may be implemented as a hardware circuit inside the memory management circuit 51 or independent of the memory management circuit 51, or run by the memory management circuit 51 in the form of software or firmware.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
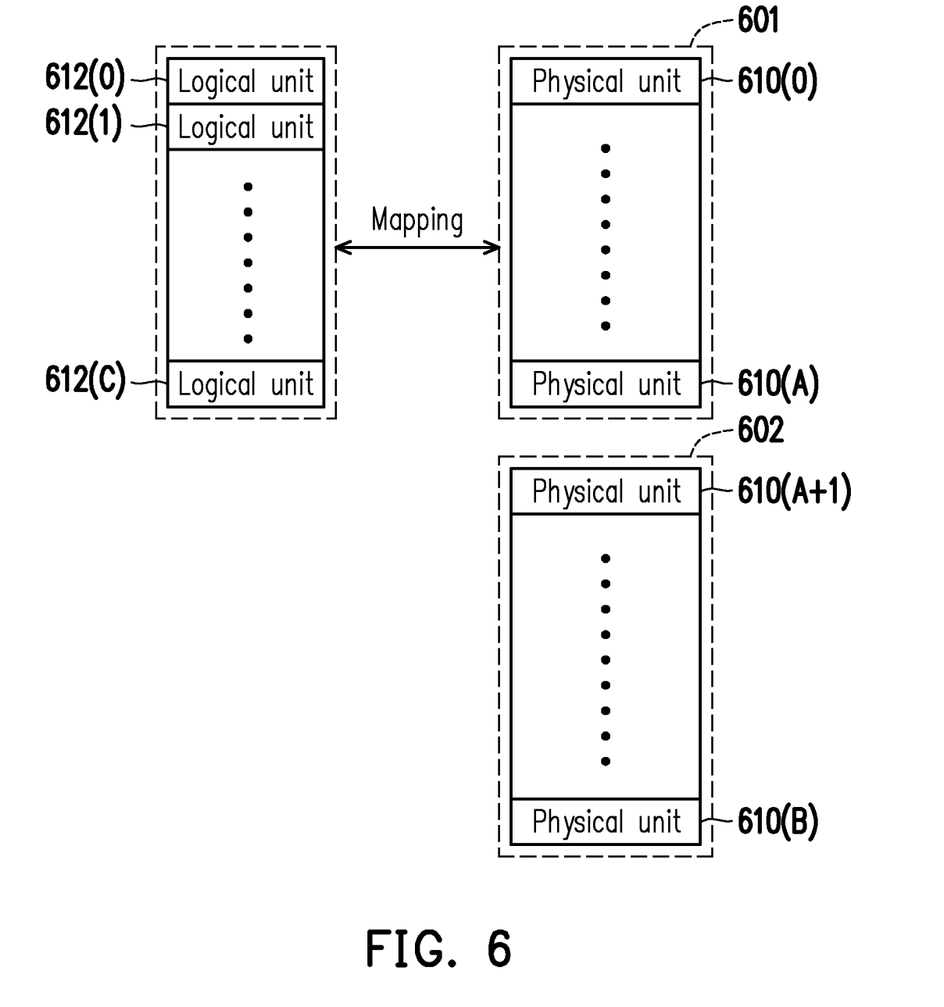
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also be composed of multiple continuous or discontinuous physical addresses. In an exemplary embodiment, a physical unit may also refer to a virtual block (VB). A virtual block may include multiple physical addresses or multiple physical programming units.

The physical units 610(0) to 610(A) in the storage area 601 are used to store the user data (for example, the user data from the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or the physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or discontinuous logical addresses.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to the information in the logical-to-physical mapping table.

Figure 7:
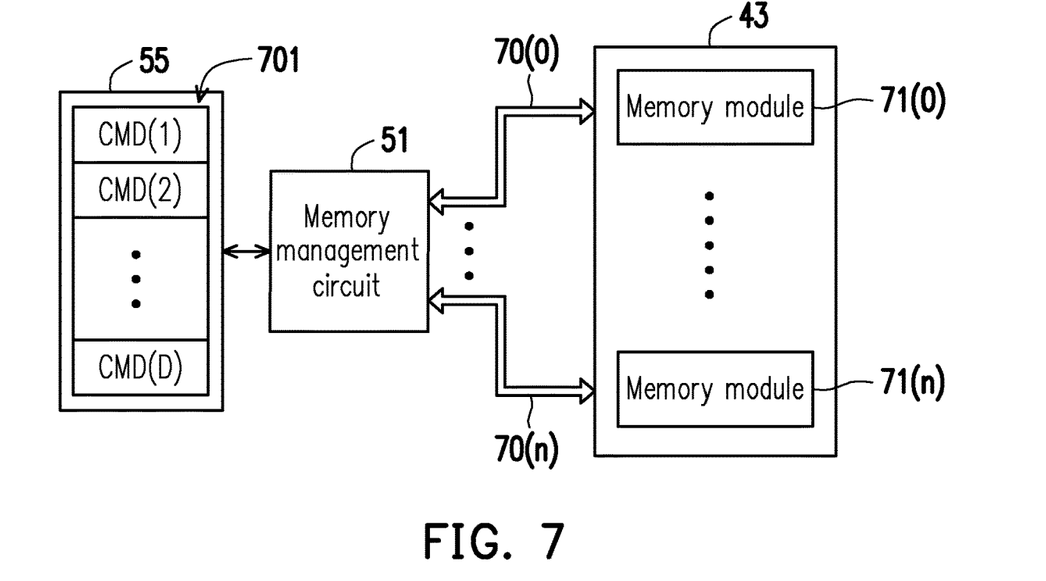
FIG. 7 is a schematic diagram of a memory management circuit accessing a rewritable non-volatile memory module according to a command in a command queue according to an exemplary embodiment of the disclosure.

FIG. 7 is a schematic diagram of a memory management circuit accessing a rewritable non-volatile memory module according to a command in a command queue according to an exemplary embodiment of the disclosure. Please refer to FIG. 7. The rewritable non-volatile memory module 43 may include multiple memory modules 71(0) to 71(n), where n may be any positive integer. Each of the memory modules 71(0) to 71(n) may contain multiple physical units. Each of the memory modules 71(0) to 71(n) may independently execute operations such as data reading, writing, or erasing. In addition, multiple of the memory modules 71(0) to 71(n) may also execute operations such as data reading, writing, or erasing in parallel. For example, one of the memory modules 71(0) to 71(n) may refer to a plane, a chip enable (CE) region, a die, or other physical management units.

The memory management circuit 51 may respectively communicate with the memory modules 71(0) to 71(n) via channels 70(0) to 70(n). For example, the memory management circuit 51 may issue an operation command to the memory module 71(i) via the channel 70(i). The memory module 71(i) may receive the operation command via the channel 70(i) and execute a corresponding operation behavior. In addition, the memory module 71(i) may return data to the memory management circuit 51 via the channel 70(i). Alternatively, in an exemplary embodiment, multiple of the memory modules 71(0) to 71(n) may also share the same channel 70(i).

In an exemplary embodiment, a command queue 701 is stored in the buffer memory 55. The total number of the command queue 701 may be one or more, which is not limited in the disclosure. The command queue 701 may be used to store commands CMD(1) to CND(D) to be executed. That is, the commands CMD(1) to CND(D) in the command queue 701 may wait to be executed by the memory management circuit 51. For example, the command CMD(j) may be a read command instructing to execute a read operation, a write command instructing to execute a write operation, or an erase command instructing to execute an erase operation. The total number of the commands CMD(1) to CND(D) may be one or more, which is not limited in the disclosure.

In an exemplary embodiment, the commands CMD(1) to CND(D) may include a command provided by the host system 11 of FIG. 1. For example, the memory management circuit 51 may temporarily store the commands CMD(1) to CND(D) obtained from the host system 11 in the command queue 701 to wait to be executed. In an exemplary embodiment, the commands CMD(1) to CND(D) may include a command generated by the memory management circuit 51. For example, the memory management circuit 51 may add a specific command to the command queue 701 to wait to be executed.

In an exemplary embodiment, the memory management circuit 51 may obtain a weight value (also referred to as a first weight value) corresponding to a specific command (also referred to as a first command) in the command queue 701. For example, the first command may include a command with the highest priority among the commands CMD(1) to CND(D). For example, the command with the highest priority may include a command to be executed with a preset priority in the command queue 701 according to a first in first out (FIFO) mechanism or other sorting mechanisms.

In an exemplary embodiment, the memory management circuit 51 may obtain a weight value (also referred to as a second weight value) corresponding to at least one command (also referred to as a second command) being executed. The total number of the second command may be one or more, which is not limited in the disclosure. For example, the second command may include a command for which an instructed operation is being executed by at least one of the memory modules 71(0) to 71(n). For example, assuming that an operation instructed by a certain command is currently being executed by the memory module 71(i), the command may be regarded as one of the second commands. In addition, once the execution of an operation instructed by a certain command is completed in a specific memory module, the command will not be regarded as the second command. In other words, the second command does not contain the commands CMD(1) to CND(D) in the command queue 701 that have not yet been executed and the commands for which the execution of the corresponding operations is completed.

In an exemplary embodiment, the memory management circuit 51 may obtain the sum of the first weight value and the second weight value. Then, the memory management circuit 51 may judge whether the sum of the first weight value and the second weight value is greater than a base value. In an exemplary embodiment, in response to the sum of the first weight value and the second weight value being greater than the base value, the memory management circuit 51 may delay the execution of the first command. For example, delaying the execution of the first command may include temporarily not executing the first command and/or skipping the first command and executing other commands in the command queue 701. In an exemplary embodiment, once the execution of the first command is delayed, the execution of other commands in the command queue 701 is also delayed (that is, the other commands in the command queue 701 are temporarily not executed).

In an exemplary embodiment, in response to the sum of the first weight value and the second weight value being not greater than (for example, less than or equal to) the base value, the memory management circuit 51 may (allow to) execute the first command. For example, the memory management circuit 51 may execute an operation (also referred to as a first operation) instructed by the first command according to the first command instructing a specific memory module (also referred to as a first memory module) in an idle state. For example, the first operation may include storing data to the first memory module, reading data from the first memory module, or erasing a specific physical unit in the first memory module.

In an exemplary embodiment, the first weight value corresponds to a resource cost required to execute the first command. For example, the resource cost required to execute the first command may include the time the first memory module is in a busy state while executing the first operation, the heat dissipated by the first memory module executing the first operation, and/or the system power consumption required for the first memory module to execute the first operation. Similarly, the second weight value corresponds to a resource cost required to execute the second command. For example, the resource cost required to execute the second command may include the time a specific memory module is in a busy state while executing an operation instructed by the second command, the heat dissipated by executing the operation instructed by the second command, and/or the system power consumption required to execute the operation instructed by the second command.

In an exemplary embodiment, the base value may correspond to an upper limit of the resource cost (that is, an allowable range of the resource cost) that a system can afford. For example, the upper limit of the resource cost may include the upper limit of the overall busy time of the memory modules 71(0) to 71(n) during a certain period (or at a certain timepoint), the upper limit of the overall heat dissipation of the memory storage device 10, and/or the upper limit of the overall system power consumption of the memory storage device 10. In addition, the sum of the first weight value and the second weight value may correspond to the sum of the required resource costs when the first command and the second command are simultaneously executed.

In an exemplary embodiment, the condition that the sum of the first weight value and the second weight value is not greater than the base value indicates that even if the first command and the second command are simultaneously executed, the resource costs borne by the system are still within the allowable range. Therefore, under the condition that the operational stability of the memory storage device 10 may be ensured, the memory management circuit 51 may allow the execution of the first command.

In an exemplary embodiment, the condition that the sum of the first weight value and the second weight value is greater than the base value indicates that once the first command and the second command are simultaneously executed, the resource costs borne by the system will exceed the allowable range. Therefore, under the condition that the operational stability of the memory storage device 10 cannot be ensured, the memory management circuit 51 may temporarily not execute the first command. It should be noted that in an exemplary embodiment, in response to the sum of the first weight value and the second weight value being greater than the base value, even if a first physical unit group preset for executing the first operation is in an idle state, the memory management circuit 51 still temporarily does not allow the first physical unit group to execute the first operation.

In an exemplary embodiment, the memory management circuit 51 may determine the first weight value from multiple candidate values according to the type of the first command. For example, each candidate value may correspond to a specific type of operation. Different types of operations may correspond to different candidate values.

Figure 8:
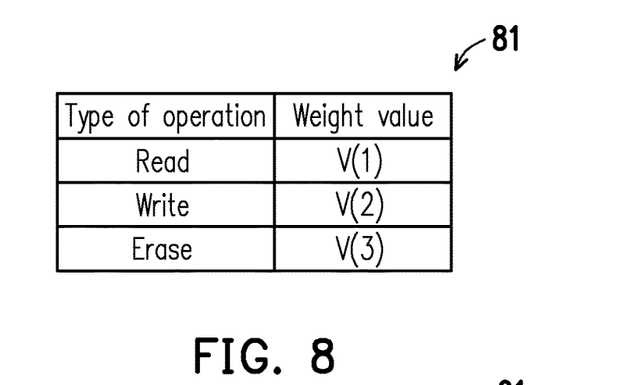
FIG. 8 is a schematic diagram of different types of operations corresponding to different weight values according to an exemplary embodiment of the disclosure.

FIG. 8 is a schematic diagram of different types of operations corresponding to different weight values according to an exemplary embodiment of the disclosure. Please refer to FIG. 8. In an exemplary embodiment, table information 81 may be stored in the rewritable non-volatile memory module 43 of FIG. 4. The memory management circuit 51 may read the table information 81 from the rewritable non-volatile memory module 43 to the buffer memory 55. According to the table information 81, the memory management circuit 51 may select one of weight values (that is, candidate values) V(1) to V(3) as the first weight value according to the type of the first command (for example, the first command is a read command, a write command, or an erase command). For example, assuming that the first command is a read command, the first weight value may be determined as V(1); assuming that the first command is a write command, the first weight value may be determined as V(2); or assuming that the first command is an erase command, the first weight value may be determined as V(3).

Figure 9:
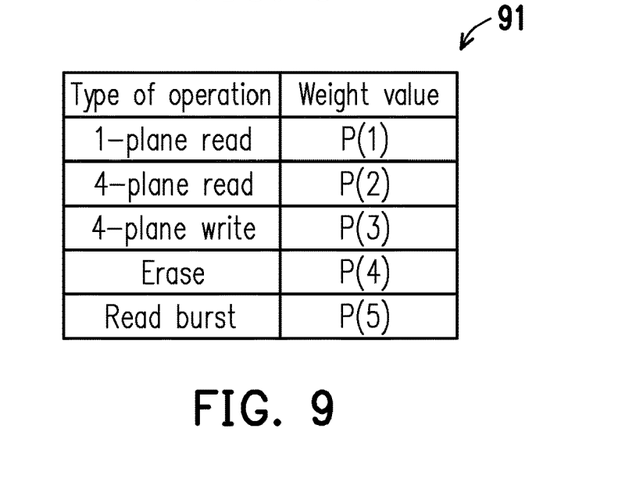
FIG. 9 is a schematic diagram of different types of operations corresponding to different weight values according to an exemplary embodiment of the disclosure.

FIG. 9 is a schematic diagram of different types of operations corresponding to different weight values according to an exemplary embodiment of the disclosure. Please refer to FIG. 9. In an exemplary embodiment, according to table information 91, the memory management circuit 51 may select one of weight values (that is, candidate values) P(1) to P(5) as the first weight value according to the type of the first command (for example, the first command is an 1-plane read command, a 4-plane read command, a 4-plane write command, an erase command, or a read burst command). It should be noted that recorded contents (containing the setting of specific types of commands and corresponding weight values) of the table information 81 of FIG. 8 and the table information 91 of FIG. 9 may all be adjusted according to practical requirements, which is not limited in the disclosure.

In an exemplary embodiment, the memory management circuit 51 may subtract the second weight value from the base value to obtain a reference value. The memory management circuit 51 may compare the first weight value with the reference value. In response to the first weight value being not greater than the reference value (equivalent to the sum of the first weight value and the second weight value being not greater than the base value), the memory management circuit 51 may (allow to) execute the first command. Alternatively, in response to the first weight value being greater than the reference value (equivalent to the sum of the first weight value and the second weight value being greater than the base value), the memory management circuit 51 may delay the execution of the first command.

In an exemplary embodiment, in response to the execution of the first command, the first command becomes one of the second commands being executed. Therefore, in response to the execution of the first command, the first weight value will be added as a part of the second weight values to reflect the resource cost occupied by the first command being executed. Afterwards, after the execution of the operation (that is, the first operation) corresponding to the first command is completed, the first command is removed from the second command, and the first weight value is deducted from the second weight value to reflect the released resource cost after the execution of the first command is completed.

Taking FIG. 9 as an example, assuming that the first command is the 4-plane read command, the memory management circuit 51 may judge whether the weight value P(2) (that is, the first weight value) corresponding to the first command is greater than the reference value. If the weight value P(2) corresponding to the first command is greater than the current reference value, the memory management circuit 51 may delay the execution of the first command (that is, temporarily not execute the first command) to avoid affecting the operational stability of the memory storage device 10.

On the other hand, if the weight value P(2) corresponding to the first command is not greater than the reference value, the memory management circuit 51 may instruct the first physical unit group in the idle state to execute the operation (that is, the first operation) corresponding to the first command. At the same time, the memory management circuit 51 may update the reference value. For example, the memory management circuit 51 may subtract the weight value P(2) from the reference value to obtain a new reference value. Thereafter, once the first physical unit group switches from the busy state to the idle state, it means that the execution of the first operation has been completed. At this time, in response to the first physical unit group restoring to the idle state (or the execution of the first operation being completed), the memory management circuit 51 may add the weight value P(2) to the reference value to obtain a new reference value.

In an exemplary embodiment, in response to the execution of the 4-plane read command being completed, the memory management circuit 51 may obtain a new first command as the read burst command. The memory management circuit 51 may judge whether the weight value P(5) (that is, the first weight value) corresponding to the first command (that is, the read burst command) is greater than the reference value. If the weight value P(5) corresponding to the first command is greater than the current reference value, the memory management circuit 51 may delay the execution of the first command (that is, temporarily not execute the first command). Conversely, if the weight value P(5) corresponding to the first command is not greater than the reference value, the memory management circuit 51 may instruct the first physical unit group in the idle state to execute the operation (that is, the first operation) corresponding to the first command. For example, the first operation may be used to read data read by the 4-plane read command from a register of the first physical unit group. At the same time, the memory management circuit 51 may update the reference value. For example, the memory management circuit 51 may subtract the weight value P(5) from the reference value to obtain a new reference value. Afterwards, after confirming receipt of responses from the first physical unit group for all sent read burst commands, the memory management circuit 51 may add the weight value P(5) to the reference value to obtain a new reference value. So far, a data read behavior of the 4-plane read command (containing the subsequent read burst command) is completed. It should be noted that other types of operation commands may be controlled to be executed and not executed by similar principles, which will not be repeated here.

In an exemplary embodiment, after delaying the execution of the first command, the memory management circuit 51 may obtain a weight value (also referred to as a third weight value) corresponding to another command (also referred to as a third command) in the command queue 701. In particular, the priority of the third command in the command queue 701 may be lower than the priority of the first command in the command queue 701. For example, the third command may be used to execute a specific operation (also referred to as a second operation) on another memory module (also referred to as a second memory module) in an idle state among the memory modules 71(0) to 71(n). The first physical unit group is different from the second memory module. For example, the memory management circuit 51 may obtain the third weight value corresponding to the third command according to the table information 81 or 91.

In an exemplary embodiment, the memory management circuit 51 may judge whether the sum of the third weight value and the second weight value is greater than the base value. In response to the sum of the third weight value and the second weight value being not greater than the base value, the memory management circuit 51 may (allow to) execute the third command. Alternatively, in response to the sum of the third weight value and the second weight value being greater than the base value, the memory management circuit 51 may also temporarily not execute the third command (that is, delay the execution of the third command). By analogy, the memory management circuit 51 may determine whether to execute a fourth command according to whether the sum of a weight value corresponding to another command (also referred to as the fourth command) in the command queue 701 and the second weight value is greater than the base value.

Figure 10:
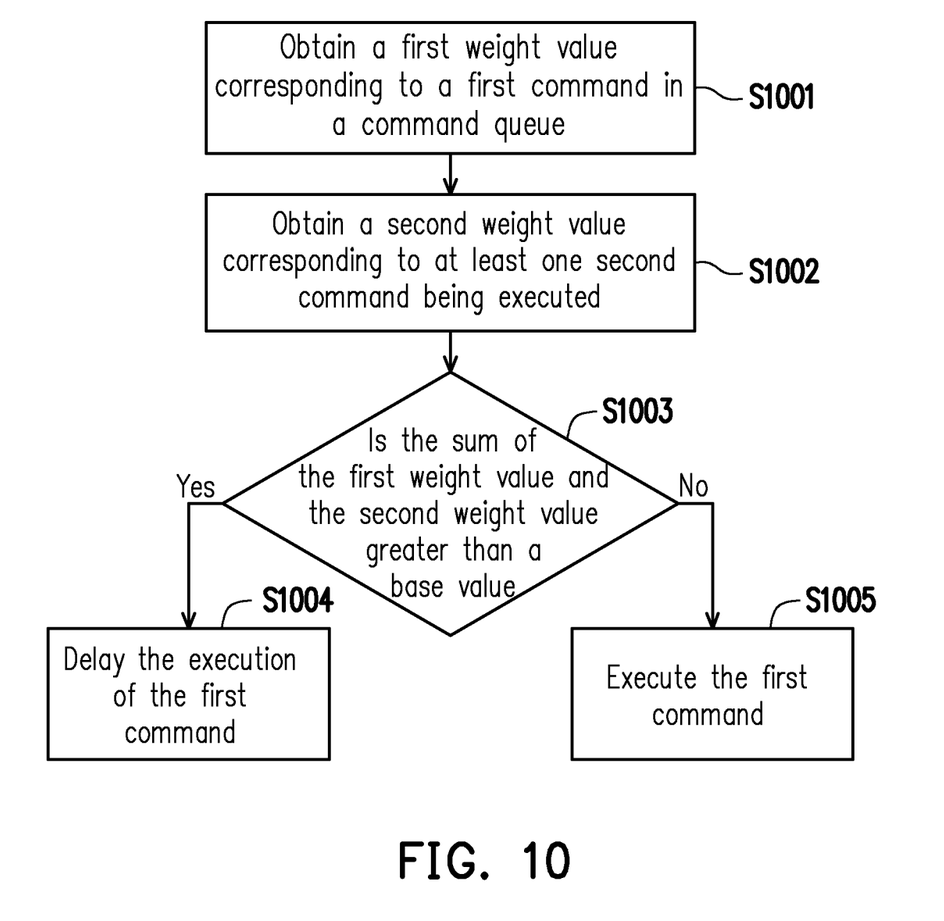
FIG. 10 is a flowchart of a memory management method according to an exemplary embodiment of the disclosure.

FIG. 10 is a flowchart of a memory management method according to an exemplary embodiment of the disclosure. Please refer to FIG. 10. In Step S1001, a first weight value corresponding to a first command in a command queue is obtained, wherein the command queue is used to store at least one command to be executed. In Step S1002, a second weight value corresponding to at least one second command being executed is obtained. In Step S1003, whether the sum of the first weight value and the second weight value is greater than a base value is judged. In response to the sum of the first weight value and the second weight value being greater than the base value, in Step S1004, the execution of the first command is delayed. Alternatively, in response to the sum of the first weight value and the second weight value being not greater than the base value, in Step S1005, the first command is (allowed to be) executed.

However, each step in FIG. 10 has been described in detail as above and will not be repeated here. It should be noted that each step in FIG. 10 may be implemented as multiple program codes or circuits, which is not limited in the disclosure. In addition, the method of FIG. 10 may be used in conjunction with the above exemplary embodiments or may be used alone, which is not limited in the disclosure.

In summary, the exemplary embodiments of the disclosure propose to evaluate whether the system has sufficient resource costs to synchronously execute the first command and the second command and control the execution of the first command accordingly by judging whether the sum of the first weight value corresponding to the first command to be executed and the second weight value corresponding to the second command being executed is greater than the base value. In this way, the efficiency of the memory storage device can be improved as much as possible under the premise of considering the operational stability of the memory storage device.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A memory management method for a rewritable non-volatile memory module, comprising:
   obtaining a first weight value corresponding to a first command in a command queue, wherein the command queue is used to store at least one command to be executed;
   obtaining a second weight value corresponding to at least one second command being executed;
   in response to a sum of the first weight value and the second weight value being greater than a base value, delaying an execution of the first command;
   after delaying the execution of the first command, obtaining a third weight value corresponding to a third command in the command queue, wherein the third command is used to execute a second operation on a second memory module in the idle state among a plurality of memory modules; and in response to a sum of the third weight value and the second weight value being not greater than the base value, executing the third command,
wherein the rewritable non-volatile memory module comprises the plurality of memory modules, and the first command is used to execute a first operation on a first memory module in an idle state among the memory modules.

2. The memory management method according to claim 1, wherein the first weight value corresponds to a resource cost required to execute the first command, and the second weight value corresponds to a resource cost required to execute the at least one second command.

3. The memory management method according to claim 1, further comprising:
in response to the sum of the first weight value and the second weight value being not greater than the base value, executing the first command.

4. The memory management method according to claim 1, wherein the step of obtaining the first weight value corresponding to the first command in the command queue comprises:
determining the first weight value from a plurality of candidate values according to a type of the first command.

5. The memory management method according to claim 1, wherein the first command comprises a command with a highest priority among the at least one command to be executed.

6. A memory storage device, comprising:
a connection interface unit, used to couple to a host system;
a rewritable non-volatile memory module; and
a memory control circuit unit, coupled to the connection interface unit and the rewritable non-volatile memory module, wherein
the memory control circuit unit is used to:
obtain a first weight value corresponding to a first command in a command queue, wherein the command queue is used to store at least one command to be executed;
obtain a second weight value corresponding to at least one second command being executed;
in response to a sum of the first weight value and the second weight value being greater than a base value, delay an execution of the first command;
after delaying the execution of the first command, obtain a third weight value corresponding to a third command in the command queue, wherein the third command is used to execute a second operation on a second memory module in the idle state among a plurality of memory modules; and
in response to a sum of the third weight value and the second weight value being not greater than the base value, execute the third command
wherein the rewritable non-volatile memory module comprises the plurality of memory modules, and the first command is used to execute a first operation on a first memory module in an idle state among the memory modules.

7. The memory storage device according to claim 6, wherein the first weight value corresponds to a resource cost required to execute the first command, and the second weight value corresponds to a resource cost required to execute the at least one second command.

8. The memory storage device according to claim 6, wherein the memory control circuit unit is further used to:
in response to the sum of the first weight value and the second weight value being not greater than the base value, execute the first command.

9. The memory storage device according to claim 6, wherein the operation of obtaining the first weight value corresponding to the first command in the command queue comprises:
determining the first weight value from a plurality of candidate values according to a type of the first command.

10. The memory storage device according to claim 6, wherein the first command comprises a command with a highest priority among the at least one command to be executed.

11. A memory control circuit unit, used to control a rewritable non-volatile memory module, the memory control circuit unit comprising:
a host interface, used to couple to a host system;
a memory interface, used to couple to a rewritable non-volatile memory module;
a buffer memory; and
a memory management circuit, coupled to the host interface, the memory interface, and the buffer memory, wherein
the memory management circuit is used to:
obtain a first weight value corresponding to a first command in a command queue in the buffer memory, wherein the command queue is used to store at least one command to be executed;
obtain a second weight value corresponding to at least one second command being executed;
in response to a sum of the first weight value and the second weight value being greater than a base value, delay an execution of the first command;
after delaying the execution of the first command, obtain a third weight value corresponding to a third command in the command queue, wherein the third command is used to execute a second operation on a second memory module in the idle state among a plurality of memory modules; and
in response to a sum of the third weight value and the second weight value being not greater than the base value, execute the third command,
wherein the rewritable non-volatile memory module comprises the plurality of memory modules, and the first command is used to execute a first operation on a first memory module in an idle state among the memory modules.

12. The memory control circuit unit according to claim 11, wherein the first weight value corresponds to a resource cost required to execute the first command, and the second weight value corresponds to a resource cost required to execute the at least one second command.

13. The memory control circuit unit according to claim 11, wherein the memory management circuit is further used to:
in response to the sum of the first weight value and the second weight value being not greater than the base value, execute the first command.

14. The memory control circuit unit according to claim 11, wherein the operation of obtaining the first weight value corresponding to the first command in the command queue comprises:
determining the first weight value from a plurality of candidate values according to a type of the first command.

15. The memory control circuit unit according to claim 11, wherein the first command comprises a command with a highest priority among the at least one command to be executed.

\* \* \* \* \*